(12) United States Patent
Kim (10) Patent No.: US 10,471,875 B2
(45) Date of Patent: Nov. 12, 2019

(54) CONSOLE TABLE APPARATUS FOR VEHICLES

(71) Applicant: SEOYON E-HWA CO., LTD., Seoul (KR)

(72) Inventor: Ki Ho Kim, Gyeonggi-do (KR)

(73) Assignee: SEOYON E-HWA CO., LTD. (KR)

( * ) Notice: Subject to any disclaimer, the term of this patent is extended or adjusted under 35 U.S.C. 154(b) by 0 days.

(21) Appl. No.: 16/158,511

(22) Filed: Oct. 12, 2018

(65) Prior Publication Data
US 2019/0135152 A1  May 9, 2019

(30) Foreign Application Priority Data

Nov. 9, 2017 (KR) .......................... 10-2017-0148661

(51) Int. Cl.
*B60N 3/00* (2006.01)
*B60N 3/10* (2006.01)
*A47C 7/62* (2006.01)

(52) U.S. Cl.
CPC ............. *B60N 3/002* (2013.01); *B60N 3/102* (2013.01); *A47C 7/624* (2018.08)

(58) Field of Classification Search
CPC ........ B60N 3/001; B60N 3/002; B60N 3/102; A47C 7/624
USPC ............. 108/44, 45, 152; 297/144, 145, 147
See application file for complete search history.

(56) References Cited

U.S. PATENT DOCUMENTS 3,583,760 A * 6/1971 McGregor ............. A47B 5/006
297/145
4,829,910 A * 5/1989 Lirette ..................... A47B 3/00
108/35
7,721,657 B2 * 5/2010 Carstensen ............ A47B 5/006
108/134
7,963,231 B2 * 6/2011 Osborne ................ A47B 5/006
108/40
8,205,563 B2 * 6/2012 St. Louis ............... B64D 11/00
108/40
8,336,956 B2 * 12/2012 Westerink ............. B64D 11/06
108/44

(Continued)

FOREIGN PATENT DOCUMENTS

CN         106080326 A     11/2016
KR       10 0160054 B1      8/1988

(Continued)

OTHER PUBLICATIONS

Korean Office Action corresponding to Korean Patent Application No. 1020170148661 dated Nov. 30, 2018.

*Primary Examiner* — Jose V Chen
(74) *Attorney, Agent, or Firm* — Tarolli, Sundheim, Covell & Tummino LLP (57) ABSTRACT

Disclosed herein may be a console table apparatus for a vehicle. A table configured to slide upward may be installed on a door which opens in a lateral direction of an upper module. A motor for moving the upper module upward or downward, a motor for opening the door, a motor for moving the table upward, and a motor for rotating and deploying the table are provided. A control button for controlling the motors is provided on an armrest module. A deployment operation of the table is automatically performed, so that the console table apparatus is convenient for use.

11 Claims, 6 Drawing Sheets

(56) References Cited

U.S. PATENT DOCUMENTS

| | | | | |
|---|---|---|---|---|
| 8,596,206 B2* | 12/2013 | Legeay | ................. | B60N 3/002 |
| | | | | 108/137 |
| 8,695,513 B2* | 4/2014 | Figueras Mitjans | ... | A47B 5/006 |
| | | | | 108/115 |
| 9,481,464 B2* | 11/2016 | Gow | ................. | B64D 11/0605 |
| 9,731,829 B2* | 8/2017 | Gow | ................. | B64D 11/0638 |
| 9,883,736 B2* | 2/2018 | Dashti | ...................... | A47B 3/10 |
| 9,955,779 B2* | 5/2018 | Hoeftberger | ........... | B60N 3/004 |
| 9,988,149 B2* | 6/2018 | Maillaut | ............ | B64D 11/0638 |
| 2003/0047120 A1* | 3/2003 | Dettmers | ............... | A47B 5/006 |
| | | | | 108/42 |
| 2003/0188672 A1* | 10/2003 | Parent | ................... | A47B 5/006 |
| | | | | 108/134 |
| 2010/0319588 A1* | 12/2010 | Hanna | ................... | B64D 11/06 |
| | | | | 108/20 |
| 2014/0373759 A1* | 12/2014 | Rumeau | ................ | B64D 11/04 |
| | | | | 108/44 |
| 2016/0167555 A1* | 6/2016 | Allen | ................ | B64D 11/0638 |
| | | | | 108/40 |

FOREIGN PATENT DOCUMENTS

| | | |
|---|---|---|
| KR | 20050031814 A | 4/2005 |
| WO | 2015063412 A1 | 5/2015 |

* cited by examiner

CONSOLE TABLE APPARATUS FOR VEHICLES

BACKGROUND OF THE DISCLOSURE

Field of the Disclosure

Exemplary embodiments of the present disclosure relate to a console table apparatus for vehicles, and more particularly, to a console table apparatus for vehicles in which deployment and height adjustment of a table provided in a console can be automatically performed.

Description of the Related Art

Even when a vehicle travels, occupants may do various activities such as eating, reading, writing, or using a notebook computer in a passenger compartment. Tables may be installed in the passenger compartment of the vehicle to provide convenience of such activities.

Table for vehicles are generally installed in consoles (center consoles or rear consoles). Typically, such a table for vehicles is used in such a way that a table horizontally installed in the console is simply pulled and drawn out of the console, or a table vertically installed in the console is pulled upward and then deployed by rotation.

However, the foregoing conventional table for vehicles is problematic in that a user should manually perform a table deployment operation, and the deployed table cannot be adjusted in height, thus inconveniencing the user.

RELATED ART DOCUMENT

Patent Document (Patent Document 1) Korean Patent Registration No. 10-0160054 (Aug. 14, 1998)

SUMMARY OF THE DISCLOSURE

An object of the present disclosure is to provide a console table apparatus for vehicles which is configured such that a deployment operation of a table is automatically performed, and the height of the table may be adjusted, thus improving convenience of use.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, a console table apparatus for a vehicle, including: a console including a lower module, and an upper module installed on the lower module so as to be movable upward or downward; a door rotatably installed on an opening in a side surface of the upper module so as to be opened or closed; a lift member installed on the door so as to be movable upward or downward; a table installed on the door and coupled to the lift member so that the table is moved upward or downward along with the lift member; a door open-and-close motor installed in the upper module and configured to open or close the door; a table lift motor installed on the lift member and configured to move the lift member and the table together upward or downward; and a table rotating motor installed on the lift member and configured to rotate the table.

The door open-and-close motor may be installed on a fourth mounting bracket mounted to the upper module, an arc-shaped gear having gear teeth on an arc edge surface thereof may be installed on one side of the door, and a pinion gear configured to be driven by the door open-and-close motor may engage with the arc-shaped gear.

The lift member may be installed traversing the door, the table lift motor may be installed on a first side portion of the lift member, a rack gear may be installed on the door in an upward and downward direction, and a pinion gear configured to be driven by the table lift motor may engage with the rack gear.

A hinge plate may be mounted to a lower end of the table, a first hinge pin may be provided on an end of a hinge arm formed on each of opposite ends of the hinge plate, and the table may be rotatably coupled to the lift member by the first hinge pin.

The table rotating motor may be installed on a second side portion of the lift member, the table rotating motor may include an operating rod as a final output unit, the operating rod being moved forward and rearward, a second hinge pin spaced apart from the first hinge pin may be provided on each of the hinge arms of the hinge plate, and the operating rod may be coupled to the second hinge pin by a V-shaped rotating lever.

An upper module lift motor may be provided in the lower module and configured to move the upper module upward or downward.

A first mounting bracket and a second mounting bracket may be installed on predetermined portions of a bottom of the lower module, the upper module lift motor may be installed on the first mounting bracket, a pinion gear may be installed on the second mounting bracket and configured to be driven by the upper module lift motor, and the pinion gear may engage with a rack gear installed in an upward and downward direction on a connection member mounted to the upper module.

A third mounting bracket may be installed on a central portion of the bottom of the lower module, a pinion gear may be installed on the third mounting bracket, the pinion gear may be coupled, by a shaft, with the pinion gear installed on the second mounting bracket so that the pinion gears of the second and third mounting brackets are simultaneously rotated, and the pinion gear of the third mounting bracket may engage with a rack gear installed in an upward and downward direction on another connection member mounted to the upper module.

An armrest module may be installed on an upper portion of the upper module, a table operating button may be provided on the armrest module and configured to control operations of the door open-and-close motor, the table lift motor, and the table rotating motor, and, when the table operating button is manipulated, the door open-and-close motor, the table lift motor, and the table rotating motor may be sequentially operated.

An armrest module may be installed on an upper portion of the upper module, and a height control button may be provided on the armrest module and configured to control an operation of the upper module lift motor.

A cup holder hole may be formed passing through the table.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly under

DESCRIPTION OF SPECIFIC EMBODIMENTS

Reference will now be made in detail to various embodiments of the present disclosure, specific examples of which are illustrated in the accompanying drawings and described below, since the embodiments of the present disclosure may be variously modified in many different forms. However, this is not intended to limit the present disclosure to particular modes of practice, and it is to be appreciated that all changes, equivalents, and substitutes that do not depart from the spirit and technical scope of the present disclosure are encompassed in the present disclosure. The size of each element, the thickness of lines indicating the element, etc. may be exaggerated for the purpose of clarity and convenience of description.

The terms and words used for elements in the description of the present disclosure are determined based on the functions of the elements in the present disclosure. The terms and words may be changed depending on the intention or custom of users or operators, so that they must be defined based on the whole content of the present specification. Therefore, definition of the terms should be made according to the overall disclosures set forth herein.

Hereinafter, an embodiment of the present invention will be described in detail with reference to the attached drawings.

Figure 1:
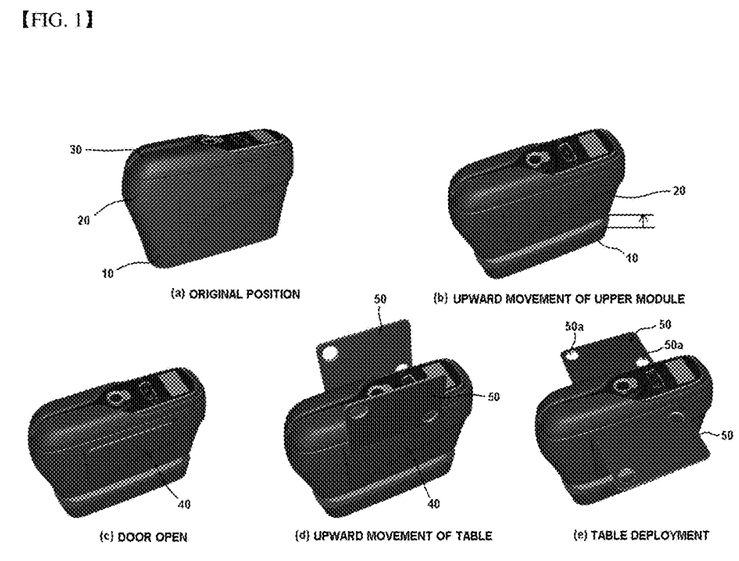
- FIG. 1 illustrates a table deployment process of a console table apparatus for vehicles in accordance with the present disclosure.

FIG. 1 illustrates a table deployment process of a console table apparatus for vehicles in accordance with the present disclosure. The schematic configuration of a console provided with a table and the table deployment process thereof will be described with reference to this drawing.

As shown in FIG. 1a, the console includes a lower module 10, an upper module 20, and an armrest module 30.

The lower module 10 may be fixed to the bottom of a passenger compartment of the vehicle, or may be mounted to the bottom of the passenger compartment by a slide rail and configured to be movable forward or rearward.

As shown in FIG. 1b, the upper module 20 is installed so as to be movable upward or downward with respect to the lower module 10. The upward and downward movement structure of the upper module 20 will be described in detail later herein.

As shown in FIG. 1c, a door 40 is installed in each of opposite side surfaces of the upper module 20 and configured to be opened in such a way that an upper end of the door 40 is rotated outward with respect to the console around a hinge provided in a lower end of the door 40.

A table 50 is installed in the door 40. As shown in FIG. 1d, the table 50 may move upward from the door 50 when the door 40 is in an open state.

As shown in FIG. 1e, the upwardly moved table 50 may be rotated to a horizontally oriented state, thus completing the table deployment process. In this state, the table 50 may be used in various ways as a general table. A cup holder hole 50a may be formed in the table 50 so that a beverage container such as a cup can be stably supported in the cup holder hole 50a.

The armrest module 30 may be slidable forward or rearward with respect to the upper module 20. When the armrest module 30 is moved from its original position, a cup holder 26 (refer to FIG. 2) provided in the upper module 20 is exposed to the outside to allow a user to use the cup holder 26.

Hereinbelow, the configuration of internal devices of the console for making the deployment operation of the table 50 and height adjustment thereof possible will be described.

Figure 2:
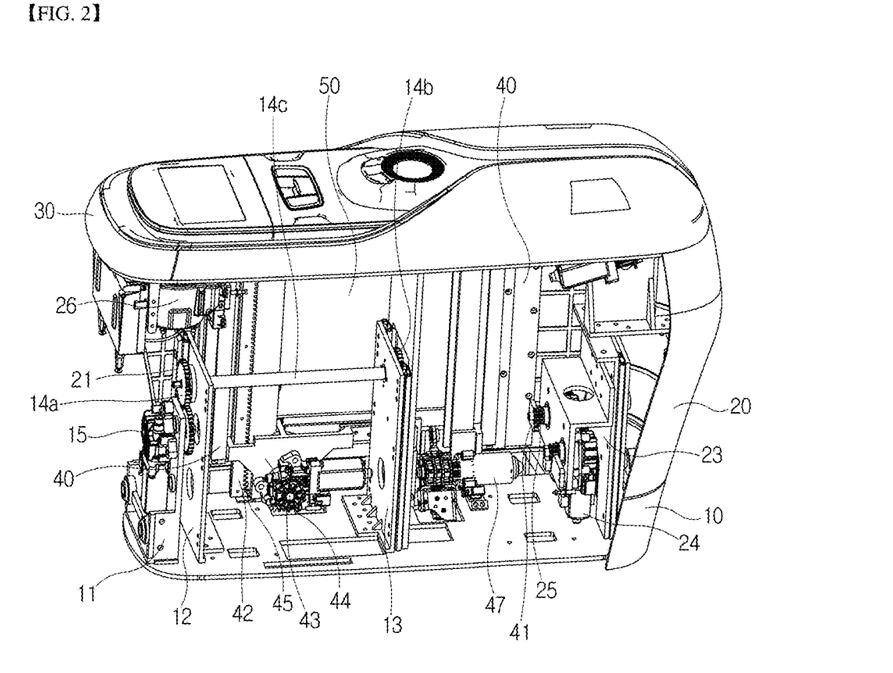
FIG. 2 is a perspective view illustrating an internal structure of the console in a table-stored state (shown on the left side of the console), in accordance with the present disclosure.
Figure 3:
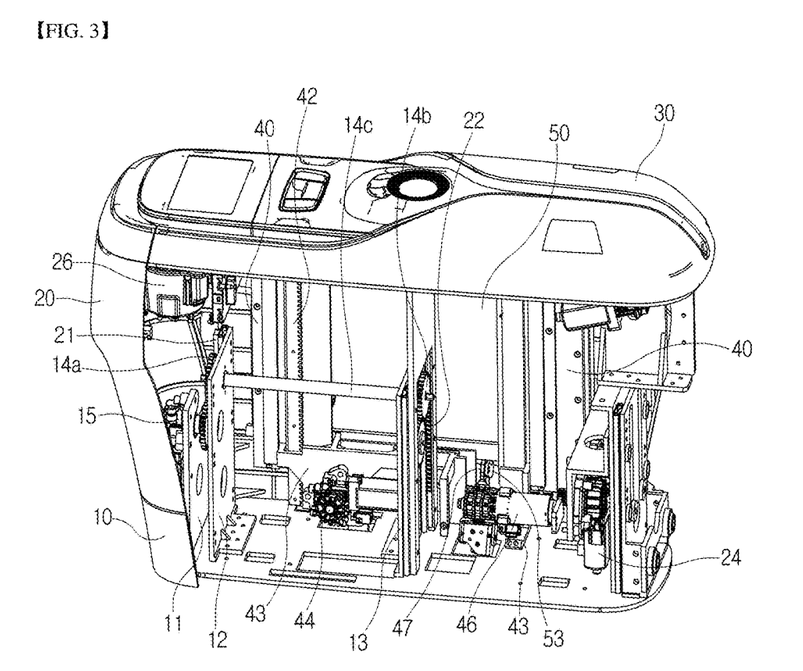
FIG. 3 is a perspective view illustrating the internal structure of the console in the table-stored state (shown on the right side of the console), in accordance with the present disclosure.

As shown in FIGS. 2 and 3, a first mounting bracket 11, a second mounting bracket 12, and a third mounting bracket 13 are uprightly installed on the bottom of the lower module 10. The first mounting bracket 11 is installed adjacent to one end of the bottom of the lower module 10. The second mounting bracket 12 is installed at a position spaced apart from the first mounting bracket 11 by a predetermined distance. The third mounting bracket 13 is installed on an approximately central portion of the bottom of the lower module 10.

A single shaft 14c is installed passing through upper portions of the second mounting bracket 12 and the third mounting bracket 13. Pinion gears 14a and 14b are mounted to respective opposite ends of the shaft 14c.

Rack gears 21 and 22, which are vertically installed, respectively engage with the pinion gears 14a and 14b. The opposite rack gears 21 and 22 are installed on the upper module 20 and mounted to respective connection members which are moved upward or downward integrally with the upper module 20. Each connection member is fixed to the upper module 20 to form a portion of the upper module 20 and may be formed of, e.g., a panel or bracket.

An upper module lift motor 15 is installed on the first mounting bracket 11. The upper module lift motor 15 operates a first side pinion gear 14a. In detail, although the upper module lift motor 15 is provided with a gearbox and a final gear of the gearbox operates the pinion gear 14a, description of the gearbox will be omitted for the sake of explanation, and the upper module lift motor 15 will be described as operating the pinion gear 14a. Such a description scheme will be applied in the same manner to motors to be described later.

Therefore, if the upper module lift motor 15 operates, the pinion gears 14a and 14b are rotated. Here, since the opposite pinion gears 14a and 14b are coupled to each other by the shaft 14c, the pinion gears 14a and 14b are integrally rotated. Thereby, the rack gears 21 and 22 and the connection members to which the rack gears 21 and 22 are mounted are moved upward or downward. Consequently, the upper module 20 coupled with the connection members is moved upward or downward.

A fourth mounting bracket 23 coupled to the upper module 20 is installed in the console at a position opposite to the position at which the first mounting bracket 11 is installed. A door open-and-close motor 24 is installed on the fourth mounting bracket 23. Therefore, the door open-and-close motor 24 is moved upward or downward along with the upper module 20.

The door 40 is configured such that opposite ends of the lower end thereof is coupled by the hinge to respective opposite sides of an opening (in which the door 40 is installed) of the upper module 20 so that the upper end of the door 40 can be rotated around the hinge and thus opened or closed.

An arc-shaped gear 41 having gear teeth on a circular arc surface thereof is mounted to a console-inside surface of the door 40. The arc-shaped gear 41 engages with the corresponding pinion gear 25 that is operated by the door open-and-close motor 24.

Therefore, when the door open-and-close motor 24 is operated, the arc-shaped gear 41 interlocking with the pinion gear 25 is rotated in a direction depending on a rotation direction of the pinion gear 25, whereby the door 40 is opened or closed.

A lift member 43, which moves upward or downward with respect to the door 40, is installed on an inner portion of the door 40. The lift member 43 is installed traversing the door 40. Each of opposite ends of the lift member 43 may be coupled to the door 40 by a guide unit such as a slide rail.

A table lift motor 44 is installed on a predetermined portion of the lift member 43. A pinion gear 45 which is operated by the table lift motor 44 engages with a rack gear 42 mounted to a predetermined portion of the door 40. Therefore, if the pinion gear 45 is rotated by the operation of the table lift motor 44, the lift member 43 is moved along the rack gear 42 upward or downward with respect to the door 40.

The table 50 is provided inside the door 40. Opposite edges of the table 50 are inserted into respective slide grooves formed on opposite portions of the door 40 so that the upward or downward movement of the table 50 can be guided.

Figure 4:
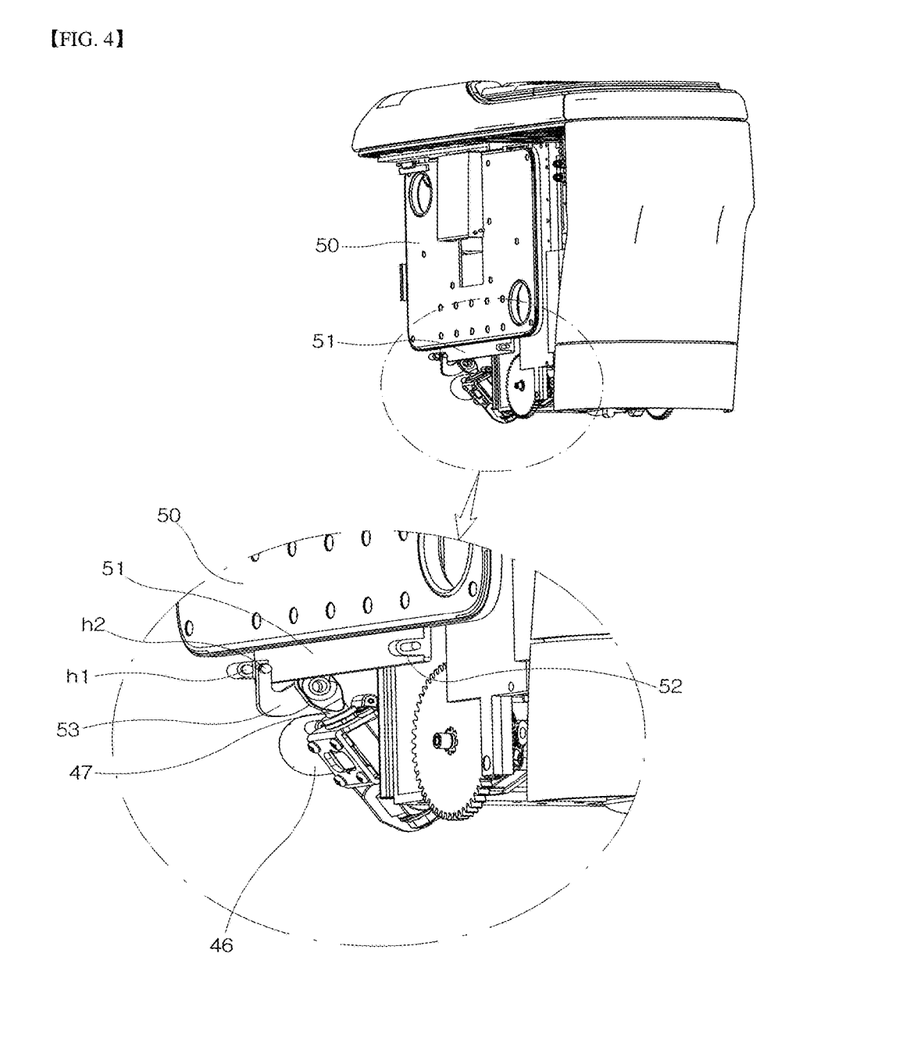
FIG. 4 is a diagram illustrating a connection structure of a table and a table rotating motor, in accordance with the present disclosure.

As shown in FIG. 4, a hinge plate 51 mounted to a lower end of the table 50 is rotatably coupled to the lift member 43 by a first hinge pin h1. Hence, when the lift member 43 moves upward or downward, the table 50 moves upward or downward along with the lift member 43.

A table rotating motor 46 is mounted on another predetermined portion of the lift member 43 and configured to be moved upward or downward along with the lift member 43. The table rotating motor 46 is an actuator having an operating rod 47, which linearly moves, as a final output unit. One end of an approximately V-shaped rotating lever 53 is coupled to the operating rod 47, and the other end of the rotating lever 53 is coupled to a second hinge pin h2 of the hinge plate 51.

Hinge arms 52 are provided on respective opposite ends of the hinge plate 51 in a direction perpendicular to the hinge plate 51. The first hinge pin h1 protrudes outward from an outer surface of an end of each hinge arm 52. The second hinge pin h2 is disposed at a position closer to the hinge plate 51 than is the first hinge pin h1, and protrudes inward from an inner surface of the hinge arm 52.

Therefore, when the table rotating motor 46 is operated, the operating rod 47 pushes or pulls the second hinge pin h2 using the rotating lever 53, whereby the hinge plate 51 rotates around the first hinge pins h1. Since the hinge plate 51 is integrally provided with the table 50, the table 50 is eventually rotated by the operation of the table rotating motor 46 and thus may be deployed in a horizontal state or returned to its original position on the same line as that of the door 40.

The upper module lift motor 15, the door open-and-close motor 24, the table lift motor 44, and the table rotating motor 46 may be controlled in on/off and operating directions by manipulating corresponding control buttons provided on the armrest module 30.

The upper module lift motor 15 functions to adjust the height of the upper module 20 and thus adjust the armrest module 30 and the table 50. A dedicated control button (height adjustment button) is provided for the upper module lift motor 15.

The door open-and-close motor 24, the table lift motor 44, and the table rotating motor 46 may be used for deployment or return of the table 50 and controlled in operation by another control button (table operating button). In detail, if the table operating button is manipulated when the table 50 is in the stored state, the door open-and-close motor 24, the table lift motor 44, and the table rotating motor 46 are operated in such a way that they are sequentially operated one by one, thus deploying the table 50. If the table operating button is manipulated when the table 50 is in the deployed state, the three motors are operated in reverse order, whereby the table 50 returns to its original position and thus is stored in the console.

The operation and effect of the console table apparatus in accordance with the present disclosure will be described.

If the upper module lift motor 15 is operated, the pinion gears 14a and 14b move the rack gears 21 and 22 upward or downward, whereby the upper module 20 is moved upward or downward so that the height of the upper module 20 can be adjusted.

The height adjustment of the upper module 20 by the operation of the upper module lift motor 15 may be independently performed because it is not related to the deployment operation of the table 50. Therefore, the height adjustment of the upper module 20 may be used to adjust the height of the armrest module 30 with the table 50 stored in the console, or may be used to adjust the height of the table 50 after the table 50 has been deployed.

Figure 5:
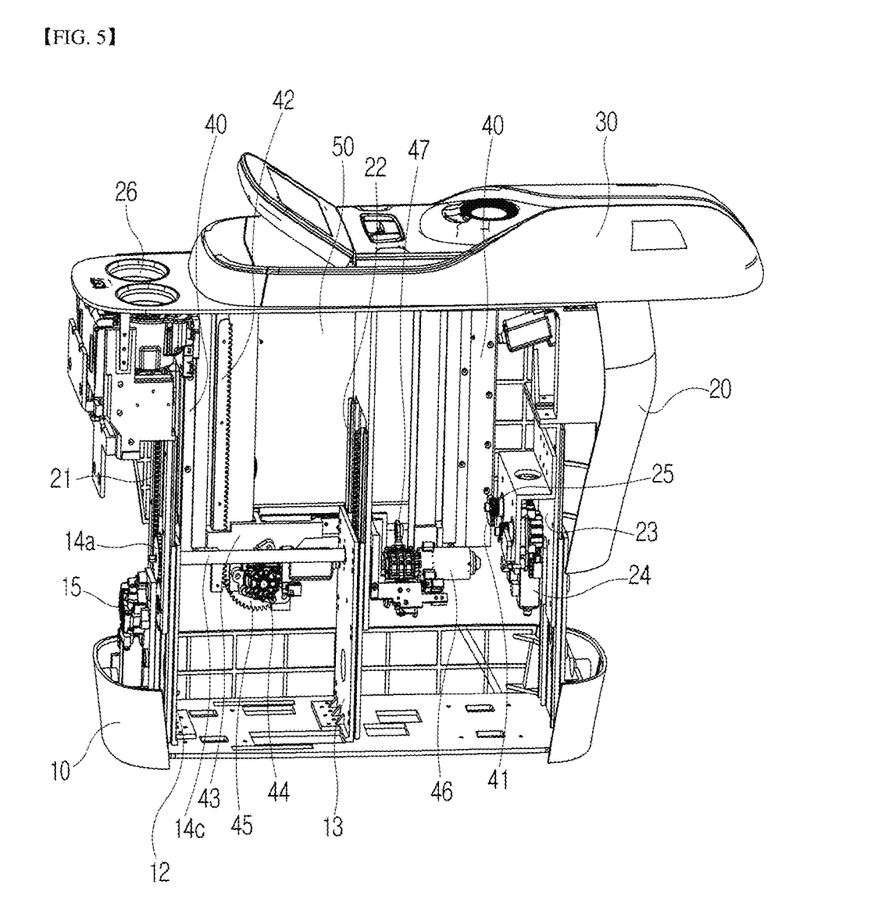
FIG. 5 is a diagram illustrating a lifted state of an upper module of the console, in accordance with the present disclosure.
Figure 6:
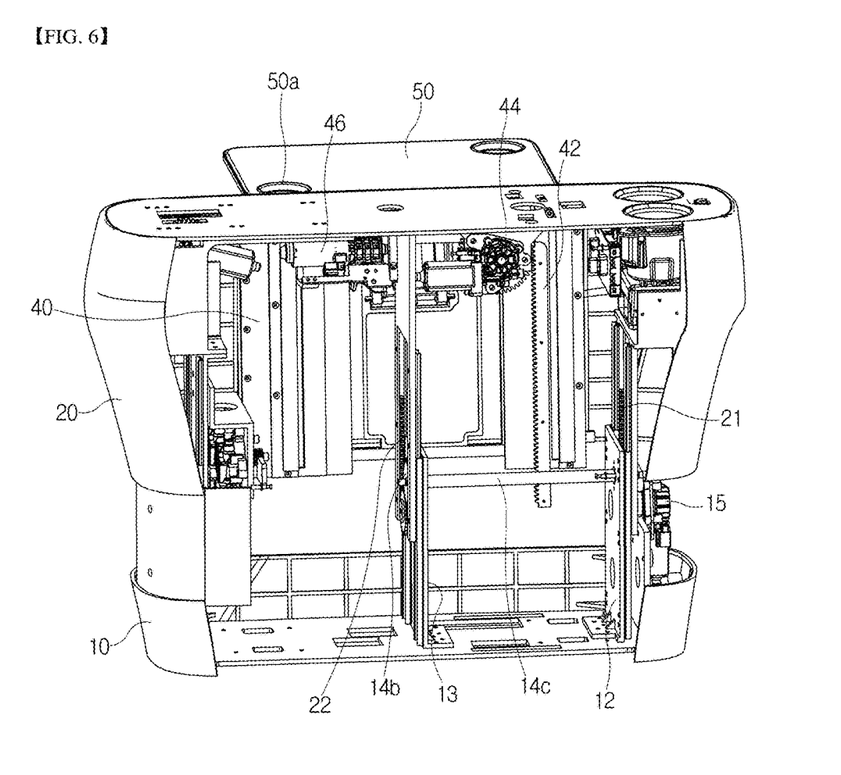
FIG. 6 is a diagram illustrating a table-deployed state, in accordance with the present disclosure.

FIGS. 5 and 6 illustrate the state in which the upper module 20 is moved upward away from the lower module by the upper module lift motor 15, and it can be shown that all of the door 40, the table 50, the lift member 43, and the door open-and-close motor 24, the table lift motor 44, and the table rotating motor 46 have been moved upward along with the upper module 20.

If the table operating button is manipulated to deploy the table 50, the door open-and-close motor 24 is first operated, so that the pinion gear 25 is rotated. Thereby, the arc-shaped gear 41 is interlocked with the pinion gear 25. Hence, the door 40 opens outward with respect to the console (refer to FIG. 1c).

Subsequently, the table lift motor 44 is operated so that the pinion gear 45 rotates with respect to the rack gear 42 mounted to the door 40, whereby the lift member 43 is moved upward. Due to the upward movement of the lift member 43, the table 50 coupled to the lift member 43 is moved upward from the door 40 and extracted out of the door 40 (refer to FIG. 1d).

Here, the table rotating motor 46 installed on the lift member 43 is moved upward along with the lift member 43.

If the rotating motor 46 is operated after the table 50 has been moved upward out of the door 40, the operating rod 47 pushes the second hinge pin h2 by the rotating lever 53, whereby the table 40 is rotated around the first hinge pin h1 coupled to the lift member 43 and deployed (refer to FIG. 1e). Here, of course, the degree to which the table rotating motor 46 is operated is preset such that the table 50 is rotated only to the horizontally-oriented state.

As such, in the horizontally deployed state of the table 50, the user may use the table 50 in various ways. If the height of the table 50 is not appropriate, the height of the upper module 20 may be adjusted by operating the upper module lift module 15, whereby the height of the table 50 may be adjusted to an appropriate height for use.

On the other hand, after the use has been completed, if the table operating button is manipulated again, the table rotating motor 46, the table lift motor 44, and the door open-and-close motor 24 are operated in reverse order. Thereby, the table 50 is rotated to a position corresponding to an upper extension line of the door 40, and moved downward into the door 40. Lastly, the door 40 is closed, so that the table 50 returns to the stored state.

As described above, in the present disclosure, a door in which a table is stored is automatically opened by a door open-and-close motor. Furthermore, a table is automatically moved upward or downward by a table lift motor and is automatically rotated by a table rotating motor.

Therefore, if a user manipulates a table operating button, the motors are sequentially operated so that deployment of the table may be automatically performed in such a way that the door opens, the table is moved upward, and the table is rotated. Hence, the user may more conveniently use the table.

A returning operation of the table is also automatically performed by manipulating the table operating button.

In addition, since the height of the table may be controlled by adjusting the height of an upper module using an upper module lift motor, the user may adjust the height of the table depending on his/her body conditions or preference so as to more comfortably use the table.

While the present disclosure has been described with respect to the specific embodiments, it will be apparent to those skilled in the art that various changes and modifications may be made without departing from the spirit and scope of the disclosure as defined in the following claims.

What is claimed is:

1. A console table apparatus for a vehicle, comprising:
   a console including a lower module, and an upper module installed on the lower module so as to be movable upward or downward with respect to the lower module;
   a door rotatably installed on an opening in a side surface of the upper module and configured to be opened or closed;
   a lift member installed on the door and configured to be movable upward or downward with respect to the door;
   a table installed on the door and coupled to the lift member so that the table is moved upward or downward along with the lift member;
   a door open-and-close motor installed in the upper module and configured to open or close the door;
   a table lift motor installed on the lift member and configured to move the lift member and the table together upward or downward; and
   a table rotating motor installed on the lift member and configured to rotate the table.

2. The console table apparatus according to claim 1, wherein the door open-and-close motor is installed on a fourth mounting bracket mounted to the upper module, an arc-shaped gear having gear teeth on an arc edge surface thereof is installed on one side of the door, and a pinion gear configured to be driven by the door open-and-close motor engages with the arc-shaped gear.

3. The console table apparatus according to claim 1, wherein the lift member is installed traversing the door, the table lift motor is installed on a first side portion of the lift member, a rack gear is installed on the door in an upward and downward direction, and a pinion gear configured to be driven by the table lift motor engages with the rack gear.

4. The console table apparatus according to claim 3, wherein a hinge plate is mounted to a lower end of the table, a first hinge pin is provided on an end of a hinge arm formed on each of opposite ends of the hinge plate, and the table is rotatably coupled to the lift member by the first hinge pin.

5. The console table apparatus according to claim 4, wherein the table rotating motor is installed on a second side portion of the lift member, the table rotating motor includes an operating rod as a final output unit, the operating rod being moved forward and rearward, a second hinge pin spaced apart from the first hinge pin is provided on each of the hinge arms of the hinge plate, and the operating rod is coupled to the second hinge pin by a V-shaped rotating lever.

6. The console table apparatus according to claim 1, wherein an upper module lift motor is provided in the lower module and configured to move the upper module upward or downward.

7. The console table apparatus according to claim 6, wherein a first mounting bracket and a second mounting bracket are installed on predetermined portions of a bottom of the lower module, the upper module lift motor is installed on the first mounting bracket, a pinion gear is installed on the second mounting bracket and configured to be driven by the upper module lift motor, and the pinion gear engages with a rack gear installed in an upward and downward direction on a connection member mounted to the upper module.

8. The console table apparatus according to claim 7, wherein a third mounting bracket is installed on a central portion of the bottom of the lower module, a pinion gear is installed on the third mounting bracket, the pinion gear is coupled, by a shaft, with the pinion gear installed on the second mounting bracket so that the pinion gears of the second and third mounting brackets are simultaneously rotated, and the pinion gear of the third mounting bracket engages with a rack gear installed in an upward and downward direction on another connection member mounted to the upper module.

9. The console table apparatus according to claim 6, wherein an armrest module is installed on an upper portion of the upper module, and a height control button is provided on the armrest module and configured to control an operation of the upper module lift motor.

10. The console table apparatus of claim 1, wherein an armrest module is installed on an upper portion of the upper module, a table operating button is provided on the armrest module and configured to control operations of the door open-and-close motor, the table lift motor, and the table rotating motor, and, when the table operating button is manipulated, the door open-and-close motor, the table lift motor, and the table rotating motor are sequentially operated.

11. The console table apparatus according to claim 1, wherein a cup holder hole is formed passing through the table.

* * * * *